(12) United States Patent
Hodges et al.

(10) Patent No.: US 8,657,192 B2
(45) Date of Patent: Feb. 25, 2014

(54) APPARATUS AND METHOD FOR ENCRYPTING DATA IN A MAGNETIC STRIPE READER

(71) Applicant: VeriFone, Inc., San Jose, CA (US)

(72) Inventors: Andrew Graham Hodges, Bucks (GB); Gavin Roy Howard, Oxon (GB)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 13/857,057

(22) Filed: Apr. 4, 2013

(65) Prior Publication Data

US 2013/0238507 A1 Sep. 12, 2013

Related U.S. Application Data

(63) Continuation of application No. 13/525,785, filed on Jun. 18, 2012, now abandoned, which is a continuation of application No. 13/235,066, filed on Sep. 16, 2011, now abandoned, which is a continuation of application No. 12/040,564, filed on Feb. 29, 2008, now abandoned.

(51) Int. Cl.
*G06K 7/08* (2006.01)
(52) U.S. Cl.
USPC ........... 235/449; 235/380; 235/383; 235/450; 235/493

(58) Field of Classification Search
USPC .......................... 235/375, 380, 449, 493, 450
See application file for complete search history.

(56) References Cited

U.S. PATENT DOCUMENTS

| | | | | |
|---|---|---|---|---|
| 5,438,186 | A * | 8/1995 | Nair et al. | 235/449 |
| 5,821,516 | A * | 10/1998 | Vandenengel | 235/441 |
| 7,028,191 | B2 * | 4/2006 | Michener et al. | 713/182 |
| 2003/0192948 | A1* | 10/2003 | Izuyama | 235/449 |
| 2005/0167496 | A1* | 8/2005 | Morley et al. | 235/449 |
| 2006/0124756 | A1* | 6/2006 | Brown | 235/492 |
| 2006/0249574 | A1* | 11/2006 | Brown et al. | 235/380 |
| 2008/0243701 | A1* | 10/2008 | von Mueller | 705/65 |
| 2009/0173790 | A1* | 7/2009 | Hart et al. | 235/449 |

\* cited by examiner

*Primary Examiner* — Tuyen K Vo
(74) *Attorney, Agent, or Firm* — Stein IP, LLC

(57) ABSTRACT

A magnetic stripe reader assembly for a point of sale terminal is provided. The magnetic stripe reader reads the account data from a card and may encrypt it within the magnetic head. An encrypted representation of the account data may be provided to a host processor in the terminal for carrying out a financial transaction, such as a payment for goods or services. The account data is typically recorded on the magnetic stripe on the card in a magnetic flux pattern that is sensed and then converted to an analog signal. Such sensing and conversion and other processing of the account data to produce the encrypted representation of the account data typically involves one or more parameters, and may include at least one parameter that is adjustable.

35 Claims, 2 Drawing Sheets

APPARATUS AND METHOD FOR ENCRYPTING DATA IN A MAGNETIC STRIPE READER

CROSS-REFERENCE TO RELATED APPLICATION

This application is a continuation of U.S. patent application Ser. Nos. 12/040,564, 13/235,066 and 13/525,785, for an invention entitled APPARATUS AND METHOD FOR ENCRYPTING DATA IN A MAGNETIC STRIPE READER, filed Feb. 29, 2008, Sep. 16, 2011 and Jun. 18, 2012, which are hereby incorporated by reference in their entirety for any and all purposes.

BACKGROUND

Magnetic stripe reader assemblies are used in point of sale terminals, such as countertop or portable handheld devices that may be provided in retail establishments to transact payments for goods and services using credit, debit, or other payment cards. Such point of sale terminals are subject to attempts to obtain credit, debit, or other account data for improper purposes. Generally, the account data stored on the magnetic stripe of the card is unencrypted and is initially read in this unencrypted form by a magnetic head in the magnetic stripe reader. Thus, the head may be particularly subject to improper attempts to obtain account data. To counteract such attempts, the terminals, including the head, may be provided with security measures.

SUMMARY

The disclosed point of sale terminal includes a magnetic stripe reader that reads the account data from a card and may encrypt the data within the magnetic head. An encrypted representation of the account data may be provided to a host processor in the terminal for carrying out a financial transaction, such as a payment for goods or services. The account data is typically recorded on the magnetic stripe on the card in a magnetic flux pattern that is sensed and then converted to an analog signal. Such sensing and conversion and other processing of the account data to produce the encrypted representation of the account data typically involves one or more parameters, and may include at least one parameter that is adjustable. The account data will be understood to include any type of data that may be recorded on a card. Typically for a card that corresponds to a credit account or a debit account, the account data will include the standard data required and/or permitted by the relevant standardization authorities. In addition, the account data may include any and all other data that may be used for any purpose in any use of the magnetic stripe reader in any type of commercial or other transaction.

The magnetic head may include a sensing element capable of detecting the magnetic flux pattern on the magnetic stripe when the card is moved with the magnetic stripe adjacent the sensing element. The magnetic head may also include a microcontroller with an analog-to-digital converter, a signal processor coupled to the analog-to-digital converter, and an encryption unit coupled to the signal processor. The encryption unit may provide an output coupled to the host processor.

The sensing element may produce an analog signal representing the magnetic flux pattern and communicate the analog signal to the analog-to-digital converter, which in turn may convert the analog signal to a digital signal. The signal processor may convert the digital signal to the representation of the account data, and the encryption unit may encrypt the representation of the account data for output to the host processor. Either or both of the signal processor and the encryption unit may include one or more adjustable parameters, such as a sensitivity setting. The microcontroller may include an interface for changing any adjustable parameter.

The signal processor may determine, from the digital signal provided by the analog-to-digital converter, a series of selected data points that represent the account data. For example, the selected data points may be a series of times representing minimum values and maximum values of the digital signal or a series of times representing zero-crossing values of the digital signal, or a series of selected amplitudes of the digital signal. The encryption unit may operate on these selected data points to provide the encrypted representation of the account data to the host processor. Alternatively, the signal processor may decode the selected data points, e.g., to determine the raw data (in binary ones and zeroes) representing the account data. Such raw data may further be decoded by the signal processor by identifying a start sentinel (fixed combination of ones and zeroes) or other delimiting pattern, and combining or arranging the bits in accordance with an expected format for subsequent processing of the account data. Such decoding may be validated by checking a parity field, an end sentinel, and/or a longitudinal redundancy check (LRC) or other validity checks, to determine whether the decoding has created an appropriate representation of the account data. If not, the decoding may be repeated using different parameters, e.g, parameters related to the expected format.

The signal processor and the encryption unit may be software modules programmed to run on the microcontroller. The payment terminal may include a connection port for the interface for remotely or locally changing an adjustable parameter within the microcontroller and/or for replacing the software in the microcontroller, e.g., for a remote upgrade of a terminal in the field.

A method for processing data encoded in a magnetic flux pattern on a magnetic stripe may include the steps of detecting the magnetic flux pattern on the magnetic stripe with a sensing element on a magnetic head; producing an analog signal representing the magnetic flux pattern; converting the analog signal to a digital signal; determining a series of times representing selected data points of the digital signal; encrypting the selected data points; and providing the encrypted selected data points at an output of the magnetic head.

The advantages of the present invention will be understood more readily after a consideration of the drawings and the Detailed Description.

DETAILED DESCRIPTION

Figure 1:
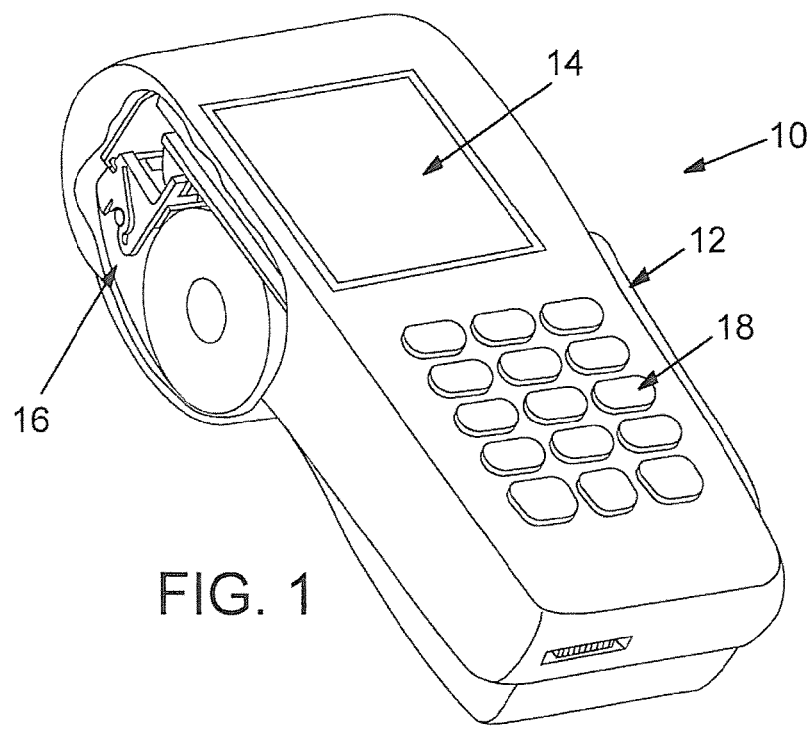
FIG. 1 is a perspective view of an exemplary point of sale terminal showing a slot for swiping a magnetic stripe of a card past a magnetic card reader.

An exemplary point of sale terminal 10 that includes a magnetic stripe reader is shown in FIG. 1. A guide slot 12 may be placed on the terminal in any suitable location, e.g., along a right-hand side of terminal 10. Guide slot 12 or other facility for moving the card relative to the reader may be provided in any suitable form that aligns the card's stripe with the reader, such as a dip slot or a motorized set of rollers that capture the card and move it past the reader at a controlled speed. Terminal 10 is typically provided with other features for specifying, controlling, and/or processing a transaction, such as a display screen 14, a printer 16, and a keypad 18. Terminal 10 may also include one or more connection ports 32, 34 (FIG. 3), such as Ethernet, a telephone line plug, or any other desired port, for coupling the terminal to an in-store cash register and/or computer system, and to remote computers, such as a payment processor or a terminal support system.

Figure 2:
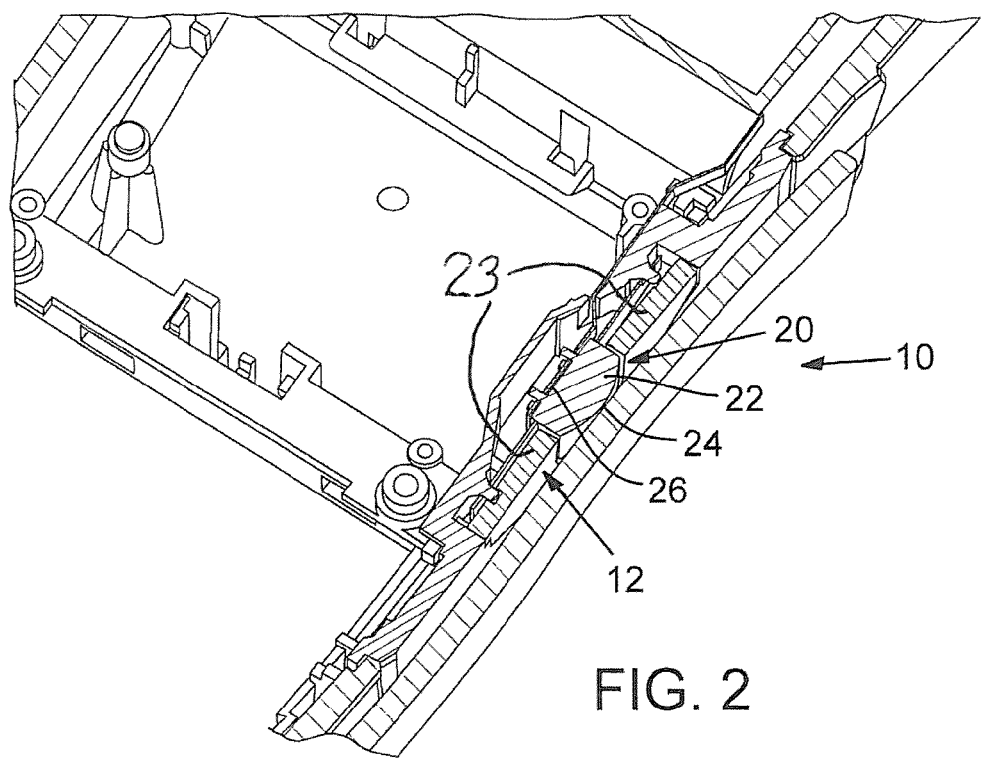
FIG. 2 is a cutaway view of the exemplary terminal of FIG. 1, particularly magnetic head.

The magnetic stripe reader 20, as seen in FIG. 2, is typically located adjacent guide slot 12. Reader 20 may include a magnetic head 22, mounted in any suitable manner in or on terminal 10. For example, a bracket 23 adjoining head 22 may surround the head and hold it in place in terminal 10. Head 22 may include a sensing element 24 facing the guide slot to bring the sensing element in close proximity to the card's magnetic stripe.

Additional sensing elements may be located in head 22 or elsewhere in or around the reader as desired for reading additional tracks on magnetic stripes. Typically, cards include three tracks, so three sensing elements are provided in the head, but any number or configuration of sensing elements may be used as appropriate for the particular cards in use.

A connector wire or wires 26 or other coupler (wired or RF) may provide for an output of the magnetic head to communicate with a host processor 30 (FIG. 3) in terminal 10. The host processor typically carries out the processing appropriate for the terminal 10 to complete transactions, with or without the cooperation of the in-store or remote computer system.

Figure 3:
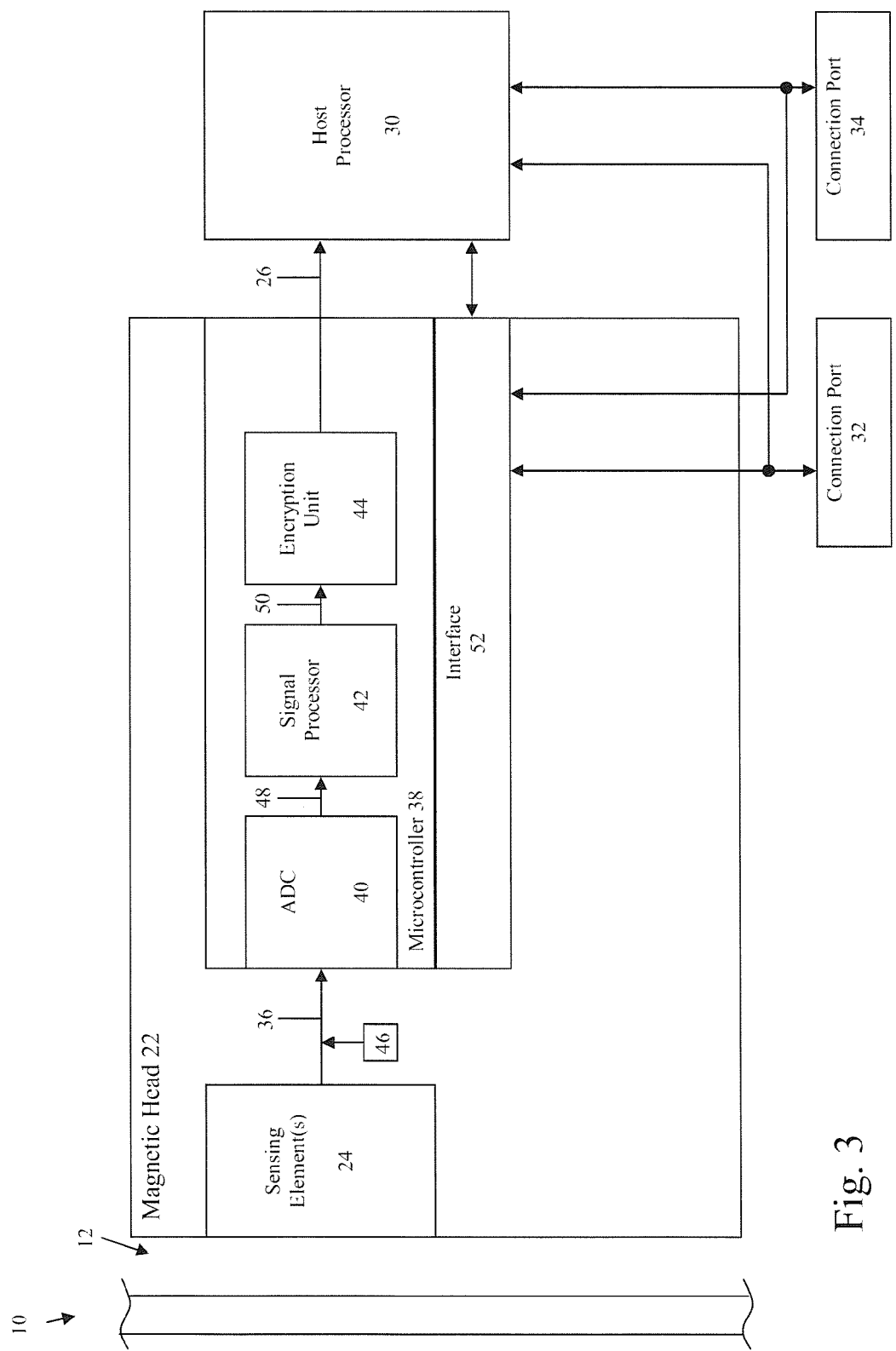
FIG. 3 is a block diagram of terminal of FIG. 1 including the magnetic head and a host processor.

As shown in block diagram in FIG. 3, terminal 10 may include magnetic head 22 that may provide for microcontroller processing and encryption of track data and a capability for adjustment of signal processing parameters. An application of terminal 10 is to provide a payment terminal for receiving a payment for a retail transaction via a card encoded with account data in a magnetic flux pattern on a magnetic stripe. As noted above, account data may include any data recorded on a card. The payment terminal for receiving a payment is one example of the use of the terminal, and the terminal may be used in any application that calls for processing or using data from a card's magnetic stripe.

The terminal may include magnetic head 22 for reading the account data on the magnetic stripe. Magnetic head 22 may include sensing element 24, which typically provides an analog signal 36. The sensing element may be configured in any suitable manner so that it responds to the magnetic flux pattern on the magnetic stripe and produces analog signal 36 representing the magnetic flux pattern.

The magnetic head may be provided with further security measures, such as a conductive grid arranged to respond to an attempt to tamper with the head, for example by triggering a destruction of certain encryption keys or otherwise disabling the terminal. Another security measure that may be applied is to encase the magnetic head in a suitable material, such as epoxy, to prevent monitoring signals within the head.

The sensing element may be coupled by analog signal 36 to a microcontroller 38. Where multiple sensing elements are used, additional microcontrollers may be provided or the microcontroller 38 may be provided with multiplexing or other circuitry allowing it to handle multiple sensing elements.

Typically, the microcontroller includes an analog-to-digital converter (ADC) 40, a signal processor 42 coupled to ADC 40, and an encryption unit 44 coupled to signal processor 42. The microcontroller or other circuitry associated with magnetic head 22 may provide for other signals to and from the sensing elements, such as ground or bias supply voltages, as desired for a particular application. A filter 46 may be applied at analog signal 36 to remove noise from the signal. Encryption unit 44 may include an output 26, as noted above, to host processor 30 in terminal 10.

Sensing element 24 may communicate analog signal 36 to ADC 40 in microcontroller 38. Typically, ADC 40 converts analog signal 36 to a digital signal 48 that is sent to signal processor 42. It will be understood that, while sensing element is shown as separate from microcontroller 38, and ADC 40, signal processor 42, and encryption unit 44 are shown as parts of microcontroller 38, these parts may be rearranged or grouped as desired for a particular application or construction of head 22 and terminal 10.

Signal processor 42 may convert digital signal 48 to a signal 50 that is preferably series of selected data points that are a representation of the account data. Signal processor 42 may, for example, determine a series of times representing minimum values and maximum values of digital signal 48 and provide that representation at signal 50. In such case, encryption unit 44 encrypts the minimum value times and maximum value times and provides the encrypted minimum value times and maximum value times at output 26 of the encryption unit.

Signal processor 42 may alternatively determine a series of times representing zero-crossing values of digital signal 48 and provide that representation at signal 50. Another example would be for signal processor 42 to determine a series of selected data points representing pairs of times and amplitudes of the digital signal 48, and provide that representation at signal 50. Such selected data point pairs may be at maximum and minimum points of digital signal 48, or other suitable points for representation of the account data. In each case, the encryption unit is capable of encrypting the series of selected data points and providing the encrypted data at output 26.

Signal processor 42 may pass signal 50 with the selected data points on to the encryption unit, as described below, or alternatively, signal processor 42 may decode the selected data points, e.g., to determine the raw data (in binary ones and zeroes) representing the account data. Signal processor may then pass on such raw data to the encryption unit, or alternatively, the signal processor may further decode the raw data by, e.g., identifying a start sentinel (fixed combination of ones and zeroes) or other delimiting pattern, and combining or arranging the bits in accordance with an expected format for subsequent processing of the account data. Such decoding may be validated, in signal processor 42 or elsewhere, by checking a parity field, an end sentinel, a longitudinal redundancy check (LRC) and/or other validity checks, to determine whether the decoding has created an appropriate representation of the account data. If not, the decoding may be repeated using different parameters, e.g, parameters related to the expected format. Such decoded data may then be provided as a representation of the account data on signal 50.

Signal 50 may be provided to encryption unit 44 which may encrypt the representation of the account data and provide the encrypted representation of the account data at output 26. Encryption unit 44 may use any desired encryption scheme, including symmetric and asymmetric encryption schemes.

Encryption unit 44 may add random data with the account data at the output of the encryption unit in a suitable manner for confounding improper detection and use of the account data. Microcontroller 38 may include or be coupled to a hardware or software switch that selectively provides for encryption unit 44 not to encrypt the representation of the account data, and instead to provide the unencrypted representation at output 26.

Signal processor 42 and encryption unit 44 may be software modules programmed to run on microcontroller 38. Either or both of signal processor 42 and encryption unit 44 may include at least one adjustable parameter. For example, the signal processor may include a sensitivity setting relating to the determination of the series of times representing minimum values and maximum values of the digital signal. Signal processor 42 may also include one or more adjustable parameters that affect how the signal processor interpolates in determining the series of times representing minimum values and maximum values of the digital signal.

Microcontroller 38 may include or be coupled to an interface 52 that provides for changing the at least one adjustable parameter, either automatically or in response to a signal received via interface 52 and connection port 32 or 34, either from a local computer system or a remote computer system. Connection ports 32 or 34 may provide for a remote replacement of a software module in the terminal, such as the signal processor or encryption unit, e.g., to provide an upgrade to a terminal in the field. Connection ports 32, 34 provide for the local and/or remote computer system's communication with host processor 30 and with interface 52. The host processor may receive the upgrade and control the replacement of the software module. Alternatively, the upgrade may be applied directly through interface 52 to microcontroller 38.

Host processor 30 is preferably designed and programmed as appropriate for receiving the encrypted or unencrypted representation of the account data from head 22 and carrying out processing of the retail transaction, including decrypting and decoding as necessary and/or desired and transmitting the account data in either encrypted or unencrypted format to a local or remote computer system. Host processor may be programmed to calculate at least one parameter to be transmitted to microcontroller 38 for use in any of the conversion, processing, and encryption functions.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

Inventions embodied in various combinations and subcombinations of features, functions, elements, and/or properties may be claimed through presentation of new claims in this or a related application. Such new claims, whether they are directed to a different invention or directed to the same invention, whether different, broader, narrower or equal in scope to the original claims, are also regarded as included within the subject matter of the inventions of the present disclosure. The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed.

What is claimed:

1. A payment terminal for receiving a payment for a retail transaction via a card encoded with account data in a magnetic flux pattern on a magnetic stripe, the terminal comprising:
   a magnetic head for reading the account data on the magnetic stripe, the magnetic head including:
   a sensing element; and
   a microcontroller, the microcontroller including:
   an analog-to-digital converter,
   a signal processor coupled to the analog-to-digital converter, and
   an encryption unit coupled to the signal processor, the encryption unit including an output,
   the sensing element being configured to respond to the magnetic flux pattern on the magnetic stripe and to produce an analog signal representing the magnetic flux pattern,
   the sensing element communicating the analog signal to the analog-to-digital converter,
   the analog-to-digital converter in the microcontroller converting the analog signal to a digital signal,
   the signal processor converting the digital signal to a representation of the account data, and further wherein
   the encryption unit encrypting the representation of the account data and providing the representation of the account data at the output of the encryption unit,
   at least one of the signal processor and the encryption unit including at least one adjustable parameter, and
   the microcontroller including an interface for changing the at least one adjustable parameter, and
   the payment terminal also including a connection port for the interface for changing the at least one adjustable parameter, the port providing for a remote initiation of an adjustment to the at least one adjustable parameter.

2. The payment terminal of claim 1, further including a host processor in the terminal coupled to the output of the encryption unit, the host processor configured to receive the representation of the account data and to carry out processing of the retail transaction.

3. The payment terminal of claim 1, wherein the at least one adjustable parameter includes a sensitivity setting for the conversion by the signal processor of the digital signal to the representation of the account data.

4. The payment terminal of claim 1 further including a conductive grid arranged to respond to an attempt to tamper with the magnetic head.

5. The payment terminal of claim 1 wherein the magnetic head further includes a filter coupled between the sensing element and the microcontroller to remove noise.

6. The payment terminal of claim 1 wherein the encryption unit includes random data with the account data at the output of the encryption unit.

7. The payment terminal of claim 1 wherein the encryption unit uses a symmetric encryption scheme.

8. The payment terminal of claim 1 wherein the encryption unit uses an asymmetric encryption scheme.

9. The payment terminal of claim 1 wherein the magnetic head is encased to prevent monitoring signals within the head.

10. The payment terminal of claim 1 wherein the magnetic head further includes a second sensing element and a third sensing element, the second and third sensing elements being coupled to the microcontroller.

11. The payment terminal of claim 1 wherein the microcontroller selectively provides the representation of the account data in an unencrypted format.

12. A payment terminal for receiving a payment for a retail transaction via a card encoded with account data in a magnetic flux pattern on a magnetic stripe, the terminal comprising:
  a magnetic head for reading the magnetic stripe, the magnetic head including:
  a sensing element; and
  a microcontroller, the microcontroller including:
  an analog-to-digital converter,
  a signal processor coupled to the analog-to-digital converter, and
  an encryption unit coupled to the signal processor, the encryption unit including an output,
  the sensing element being configured to respond to the magnetic flux pattern on the magnetic stripe and to produce an analog signal representing the magnetic flux pattern,
  the sensing element communicating the analog signal to the analog-to-digital converter,
  the analog-to-digital converter in the microcontroller converting the analog signal to a digital signal,
  the signal processor determining a series of times representing minimum values and maximum values of the digital signal,
  the encryption unit encrypting the minimum value times and maximum value times and providing the encrypted minimum value times and maximum value times at the output of the encryption unit,
  the signal processor and the encryption unit being software modules programmed to run on the microcontroller,
  at least one of the signal processor and the encryption unit including at least one adjustable parameter,
  the microcontroller including an interface for changing the at least one adjustable parameter; and
  the payment terminal also including a connection port for the interface for changing the at least one adjustable parameter, the connection port providing for a remote initiation of an adjustment to the at least one adjustable parameter.

13. The payment terminal of claim 12, further including a host processor in the terminal coupled to the output of the encryption unit, the host processor configured to receive the encrypted minimum value times and maximum value times and to carry out processing of the retail transaction.

14. The payment terminal of claim 13 wherein the output of the encryption unit is coupled by radio frequency to the host processor.

15. The payment terminal of claim 12, further wherein the at least one adjustable parameter includes a sensitivity setting relating to the determination of the series of times representing minimum values and maximum values of the digital signal.

16. The payment terminal of claim 12 further including a conductive grid arranged to respond to an attempt to tamper with the magnetic head.

17. The payment terminal of claim 12 wherein the magnetic head further includes a filter coupled between the sensing element and the microcontroller to remove noise.

18. The payment terminal of claim 12 wherein the signal processor interpolates in determining the series of times representing minimum values and maximum values of the digital signal.

19. The payment terminal of claim 12 wherein the encryption unit includes random data with the encrypted minimum value times and maximum value times at the output of the encryption unit.

20. The payment terminal of claim 12 wherein the encryption unit uses a symmetric encryption scheme.

21. The payment terminal of claim 12 wherein the encryption unit uses an asymmetric encryption scheme.

22. The payment terminal of claim 12 wherein the magnetic head is encased to prevent monitoring signals within the head.

23. The payment terminal of claim 12 wherein the magnetic head further includes a second sensing element and a third sensing element, the second and third sensing elements being coupled to the microcontroller.

24. The payment terminal of claim 12 wherein the microcontroller selectively provides the minimum value times and maximum value times in an unencrypted format.

25. A magnetic head for detecting a magnetic flux pattern on a magnetic stripe, the magnetic head comprising:
  a sensing element configured to respond to the magnetic flux pattern on the magnetic stripe and to produce an analog signal representing the magnetic flux pattern; and
  a microcontroller including:
  an analog-to-digital converter coupled to receive the analog signal from the sensing element,
  a signal processor coupled to the analog-to-digital converter, and
  an encryption unit coupled to the signal processor, the encryption unit including an output,
  the analog-to-digital converter in the microcontroller converting the analog signal to a digital signal,
  the signal processor determining a series of selected data points of the digital signal,
  the encryption unit encrypting the selected data points and providing the encrypted selected data points at the output of the encryption unit,
the signal processor and the encryption unit being software modules programmed to run on the microcontroller,
  at least one of the signal processor and the encryption unit including at least one adjustable parameter,
  the microcontroller including an interface for changing the at least one adjustable parameter, and
  the payment terminal also including a connection port for the interface for changing the at least one adjustable parameter,
  the connection port providing for a remote initiation of an adjustment to the at least one adjustable parameter.

26. The magnetic head of claim 25 wherein the selected data points are the times representing minimum values and maximum values of the digital signal.

27. The magnetic head of claim 25 wherein the output of the encryption unit is provided by radio frequency.

28. The payment terminal of claim 25 further comprising a connection port providing for a remote replacement of at least one of the software modules.

29. The magnetic head of claim 25 wherein the at least one adjustable parameter includes a sensitivity setting relating to the determination of the selected data points.

30. The magnetic head of claim 25 further including a second sensing element and a third sensing element, the second and third sensing elements being coupled to the microcontroller.

31. The magnetic head of claim 25 further wherein the microcontroller selectively provides the selected data points in an unencrypted format.

32. A magnetic head for reading account data encoded in a magnetic flux pattern on a magnetic stripe, the magnetic head comprising:

a sensing element configured to respond to the magnetic flux pattern on the magnetic stripe and to produce an analog signal representing the magnetic flux pattern; and a microcontroller including:

an analog-to-digital converter coupled to receive the analog signal from the sensing element, a signal processor coupled to the analog-to-digital converter, and an encryption unit coupled to the signal processor, the encryption unit including an output, the analog-to-digital converter in the microcontroller converting the analog signal to a digital signal, the signal processor converting the digital signal to a representation of the account data, the encryption unit encrypting the representation of the account data and providing the representation of the account data at the output of the encryption unit, at least one of the signal processor and the encryption unit including at least one adjustable parameter, the microcontroller including an interface for changing the at least one adjustable parameter, and the magnetic head also includes a connection port for the interface for changing the at least one adjustable parameter, the connection port providing for a remote initiation of an adjustment to the at least one adjustable parameter.

33. The magnetic head of claim 32, further wherein one adjustable parameter is a sensitivity setting used by the signal processor in determining a series of times representing minimum values and maximum values of the digital signal.

34. The magnetic head of claim 32 further including a second sensing element and a third sensing element, the second and third sensing elements being coupled to the microcontroller.

35. The magnetic head of claim 32 further wherein the microcontroller selectively provides the minimum value times and maximum value times in an unencrypted format.

* * * * *